(12) United States Patent
Czerwiec et al.

(10) Patent No.: US 7,609,622 B2
(45) Date of Patent: Oct. 27, 2009

(54) COMMUNICATION SYSTEM HAVING ENHANCED RELIABILITY

(75) Inventors: Richard Marion Czerwiec, Raleigh, NC (US); Richard Roger Rzonca, Raleigh, NC (US); Marlin V. Simmering, Clayton, NC (US); Geert Van Wonterghem, Eeklo (BE); Jan De Groote, Berchem (BE)

(73) Assignee: Alcatel Lucent, Paris (FR)

( * ) Notice: Subject to any disclaimer, the term of this patent is extended or adjusted under 35 U.S.C. 154(b) by 876 days.

(21) Appl. No.: 10/701,089

(22) Filed: Nov. 4, 2003

(65) Prior Publication Data

US 2004/0090911 A1    May 13, 2004

(51) Int. Cl.
*H04J 1/16* (2006.01)
(52) U.S. Cl. .............. 370/228; 370/224; 370/245; 370/250; 370/244
(58) Field of Classification Search ......... 370/219–228, 370/400, 401, 245, 250
See application file for complete search history.

(56) References Cited

U.S. PATENT DOCUMENTS

| | | | | | |
|---|---|---|---|---|---|
| 4,719,625 | A | * | 1/1988 | Bell et al. | 714/4 |
| 5,056,090 | A | * | 10/1991 | Kubota | 714/4 |
| 5,187,706 | A | * | 2/1993 | Frankel et al. | 370/217 |
| 5,661,779 | A | * | 8/1997 | Lee | 379/45 |
| 6,081,530 | A | * | 6/2000 | Wiher et al. | 370/395.53 |

\* cited by examiner

*Primary Examiner*—Huy D. Vu
*Assistant Examiner*—Dady Chery
(74) *Attorney, Agent, or Firm*—RG & Associates LLC

(57) ABSTRACT

A method for a system including a plurality of encoders each for receiving a first signal and encoding to generate a respective second signal for sending to a respective subscriber, comprising receiving, in each encoder, the first signal from a first source, while testing a signal path between a second source and the encoders, the first source on a first assembly, the second source on a second assembly, and each encoder on a respective third assembly, while each encoder is receiving the first signal from the first source, receiving, in each encoder, a third signal from the second source, generating, from each encoder, a fourth signal based on the third signal, the fourth signal being a redundancy signal and receiving and examining the fourth signal at the second source and subsequently receiving the first signal from the second source.

1 Claim, 13 Drawing Sheets

```
SEND CROSS POINT
INTERCONNECT FROM
ALARM CRAFT UNIT 44
TO NT 36
```
25

FIG. 9B

| Standby Bus Test Pattern | | | | | | | | |
|---|---|---|---|---|---|---|---|---|
| | cell n | n+1 | n+2 | n+3 | n+4 | n+5 | n+6 | n+7 |
| IQDCS | 1 | 1 | 1 | 1 | 0 | 0 | 0 | 0 |
| IQUCS | 0 | 1 | 1 | 1 | 1 | 0 | 0 | 0 |
| IQULAA | 0 | 0 | 1 | 1 | 1 | 1 | 0 | 0 |
| IQUWP | 0 | 0 | 0 | 1 | 1 | 1 | 1 | 0 |
| IQDO7 | 0 | 0 | 0 | 0 | 1 | 1 | 1 | 1 |

Standby Bus Test enabling

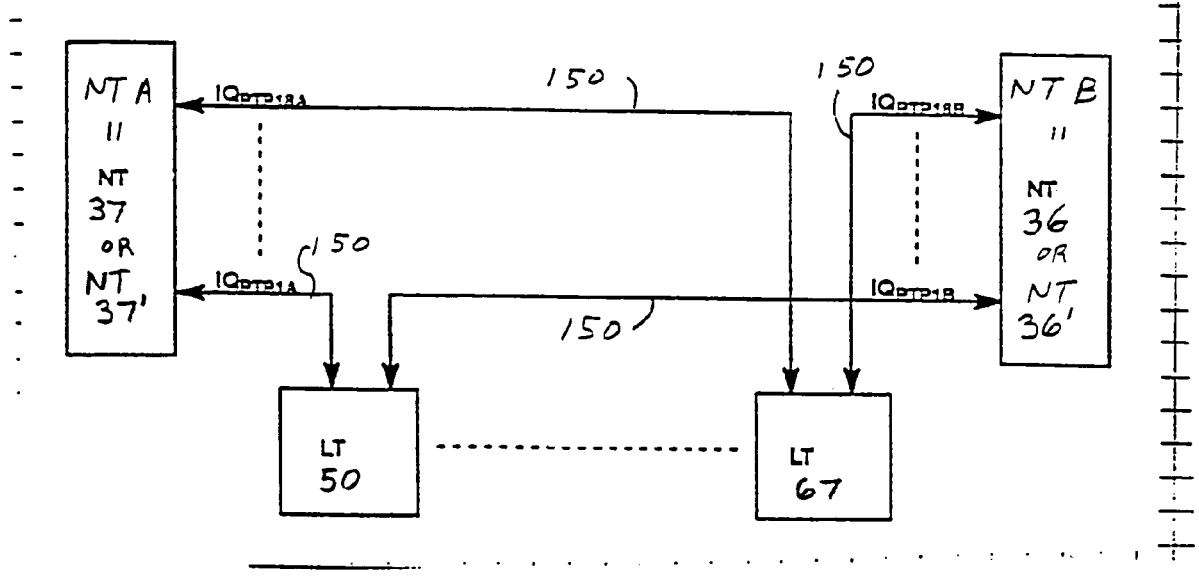

| IQ Point-To-Point links A (Differential Pairs) | | |
|---|---|---|
| Signal Name | # | Description |
| IQTXA<17:0>_T/F | 36 | Transmit 'A' Point-To-Point links between NT and LT's |
| IQRXA<17:0>_T/F | 36 | Receive 'A' Point-To-Point links between NT and LT's |

| IQ Point-To-Point links B (Differential Pairs) | | |
|---|---|---|
| Signal Name | # | Description |
| IQTXB<17:0>_T/F | 36 | Transmit 'B' links Point-To-Point between NT and LT's |
| IQRXB<17:0>_T/F | 36 | Receive 'B' links Point-To-Point between NT and LT's |

FIG. 12

COMMUNICATION SYSTEM HAVING ENHANCED RELIABILITY

This Application claims the benefit of Application Serial No. 60/136,445 filed May 28, 1999 for SPARE LINE SWITCHING APPARATUS AND METHOD.

BACKGROUND OF THE INVENTION

1. Field of the Invention Field of the Invention

This invention relates generally to the field of telecommunications and, more particularly, to a system and method of enhancing reliability while providing communication services to multiple subscribers.

2. Description of Related Art

Communication technology has had steady progress in functionality and speed, especially since the advent of the global Internet. A typical architecture includes a so called central office that transfers data between multiple servers and multiple subscribers. Hardware failure in a central office, however, may interrupt service to one or more subscribers.

SUMMARY OF THE INVENTION

It is an object of the present invention to provide a system and method for enhancing reliability in a communication center, such as a central office.

To achieve this and other objects of the present invention, there is a method for a system including a plurality of encoders each for receiving a first signal and encoding to generate a respective second signal for sending to a respective subscriber. The method comprises receiving, in each encoder, the first signal from a first source, while testing a signal path between the second source and the encoders; and subsequently a second receiving step of receiving the first signal from a second source.

According to another aspect of the present invention a system for operating with a network, the system comprises a first assembly for receiving from the network to generate a first signal; a second assembly for receiving from the network to generate the first signal; a plurality of third assemblies; a first signal path, the first signal path being for sending from the third assemblies to the first assembly; a second signal path, the second signal path being for sending from the third assemblies to the second assembly, wherein each third assembly includes a multiplexor that generates a multiplexor output responsive either to the first signal from the first assembly or the first signal from the second assembly, an encoder that encodes the multiplexor output to generate a respective second signal for sending to a respective subscriber, a sender that sends on the second signal path, at a time when the multiplexor is responsive to the first signal from the first assembly, thereby testing the second signal path.

According to yet another aspect of the present invention a system comprises a plurality of encoders each for receiving a first signal and encoding to generate a respective second signal for sending to a respective subscriber; means for receiving, in each encoder, the first signal from a first source, while testing a signal path between the second source and the encoders; and means for receiving the first signal from a second source.

According to yet another aspect of the present invention, a method comprises receiving from a network port to generate a first signal and a second signal; sending the first signal to a first set of assemblies via a first signal path; sending the second signal to a second set on assemblies via a second signal path; sending third signals from the first set of assemblies to the network port via a third signal path; and sending fourth signals from the second set of assemblies to the network port via the third signal path.

According to yet another aspect of the present invention a method comprises receiving from a network port to generate a first signal and a second signal; sending the first signal to a first set of assemblies via a first signal path; encoding, in one of the first set of assemblies, a portion of the first signal using a first protocol to send a first encoded signal to effect a first data rate for a first subscriber; sending the second signal to a second set on assemblies via a second signal path; and encoding, in one of the second set of assemblies, a portion of the second signal using a second protocol to send a second encoded signal to effect a second data rate for a second subscriber.

According to yet another aspect of the present invention a method comprises receiving from a network port on a first assembly to generate a first signal; sending the first signal to a set of second assemblies via a first signal path; sending second signals from the set of second assemblies to the first assembly via a second signal path; communicating between the first assembly and the second assemblies via third signal paths, each third signal path being electrically insulated from the other third signal paths; subsequently, receiving from a network port on a third assembly to generate the first signal; sending the first signal to the set of second assemblies via a fourth signal path; sending second signals from the set of second assemblies to the third assembly via a fifth signal path; communicating between the third assembly and the second assemblies via a sixth signal paths, each sixth signal path being electrically insulated from the other sixth signal paths.

According to yet another aspect of the present invention, a system comprises a housing with a plurality of signal busses; a plurality of assemblies, each assembly including a first connector with a plurality of conductors for sending signals between the assembly and the signal busses, an encoder that generates subscriber signals responsive to signals on the signal busses; and a plurality of second connectors, each located to receive subscriber signals from 2 adjacent assemblies.

According to yet another aspect of the present invention, a system comprises a housing with plurality of slots and a plurality of signal busses; a plurality of first assemblies removably connected to slots in the housing; a first second assembly, removably connected to a slot in the housing, the second assembly having circuitry for receiving signals from a network port, to send a signal on a selected one of a first plurality of signal paths, depending on an association between routing signals and first assemblies; a first third assembly, removably connected to a slot in the housing, the third assembly having circuitry for receiving signals from a network port, to send a signal on a selected one of a second plurality of signal paths, depending on the association; and a fourth assembly, removably connected to a slot in the housing, having a memory for storing the association.

BRIEF DESCRIPTION OF THE DRAWINGS

FIGS. 9A and 9B are a flow chart showing a process performed by the first preferred system.

FIG. 12 is a diagram emphasizing other circuitry shown in FIG. 5.

The accompanying drawings which are incorporated in and which constitute a part of this specification, illustrate embodiments of the invention and, together with the description, explain the principles of the invention, and additional advantages thereof. Throughout the drawings, corresponding parts are labeled with corresponding reference numbers.

DESCRIPTION OF THE PREFERRED EMBODIMENTS

Figure 1:
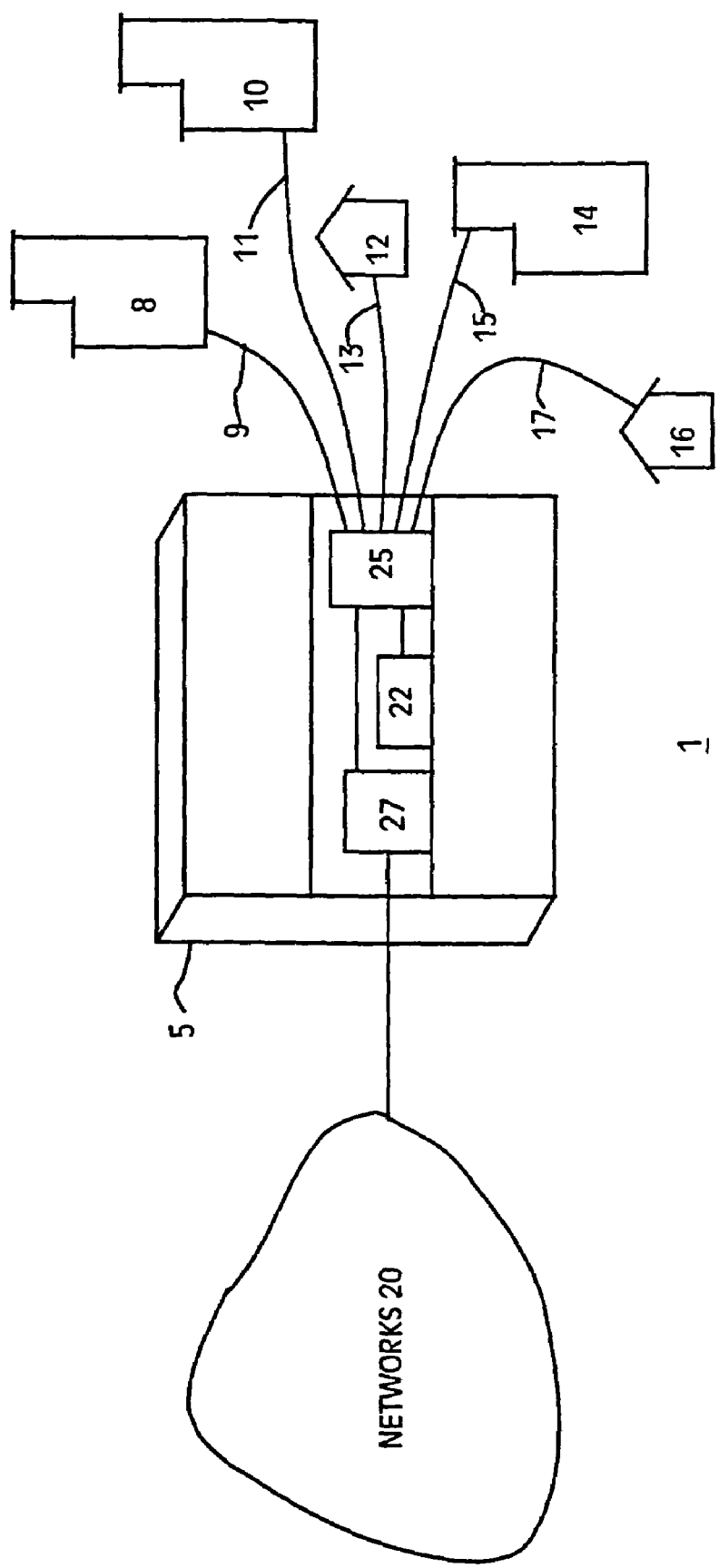
FIG. 1 is diagram of a communication system in accordance with a first preferred embodiment of the present invention.

FIG. 1 shows system 1 in accordance with a preferred embodiment of the present invention. System 1 includes central office 5 managed by a telephone company or other type of communication services provider. Central office 5 provides communication services to a plurality of subscribers, in office building 8, 10, and 14; and homes 12 and 16. Central office 5 provides communication services to the subscribers via respective subscriber lines 9, 11, 13, 15, and 17. Each subscriber line is a tip and ring twisted pair, including 2 copper wires constituting 2 contiguous current paths between central office 5 and the building of a subscriber.

Central office 5 includes access circuitry 25, telephone switch 22, and interface 27 to a wide area network (WAN) communication link 28 to service provider networks 20 in the global Internet. In this Patent Application, the word circuitry encompasses both dedicated hardware and programmable hardware, such as a CPU or reconfigurable logic array, in combination with programming data, such as sequentially fetched CPU instructions or programming data for a reconfigurable array.

Access circuitry 25 acts to combine data from networks 20 with an analog, voice band, signal from telephone switch 22, to send a composite signal to subscribers via the subscriber lines. For example, circuitry 25 receives and encodes data from networks 20 to generate a discreet multitone technology (DMT) signal, combines the DMT signal with an analog signal from telephone switch 22, and sends the composite signal over line 11 to a subscriber in office building 10. Conversely, circuitry 25 receives a composite signal from the subscriber in building 10 via line 11, filters the composite signal to send a digital signal to networks 20, and filters the composite signal to send an analog signal to telephone switch 22.

The exemplary system 1 ADSL (Asymmetric Digital Subscriber Line) and is optimized for SONET (Synchronous Optical NETwork) OC3 technologies and standards. Those skilled in the art will understand that the basic architecture of system 1 is applicable to many other technologies and standards.

Figure 2:
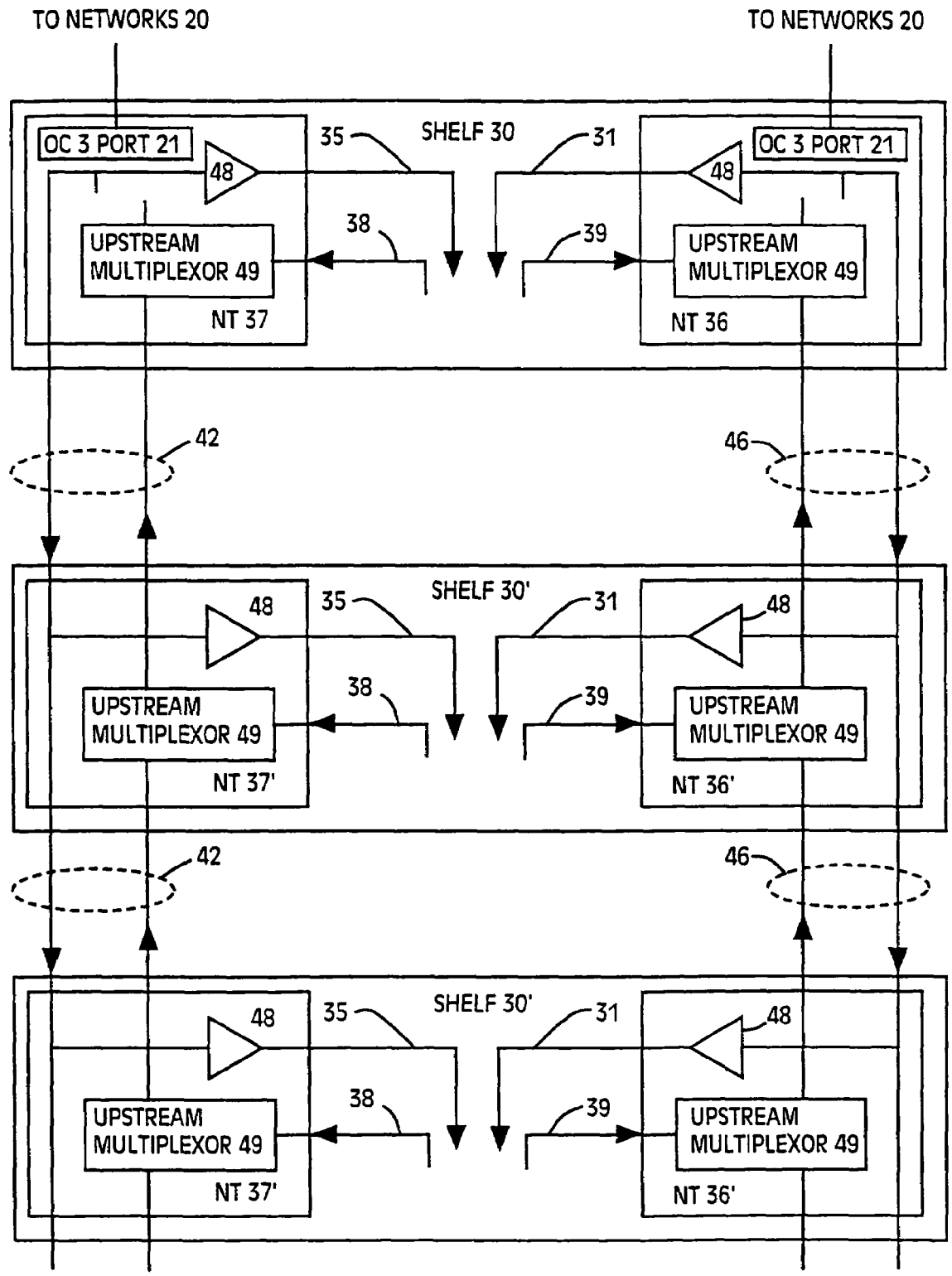
FIG. 2 is a diagram showing a connection of shelves in the first preferred system.

FIG. 2 shows a plurality of a first shelf 30 connected to a plurality of shelves 30' via daisy chain cables 42 and 46. Shelves 30 and 30' house access circuitry 25 in central office 5. Network Termination (NT) card 37 includes a SONET OC3 port 21. NT extender cards 37' include all of the circuitry of NT card 37, described later in the Patent Application, except for OC3 port 21.

Redundant NT card 36 includes a SONET OC3 port 21. Redundant NT extender cards 36' include all of the circuitry of NT card 37', described later in the Patent Application, except for OC3 port 21.

Signal buffers 48 and ATM switching circuitry sends ATM cells to other circuitry in shelves 30 and 30', via downstream busses 35 and downstream busses 31. Upstream multiplexors 49 receive ATM cells from other circuitry in shelves 30 and 30', via upstream busses 38 and upstream busses 39.

Figure 3:
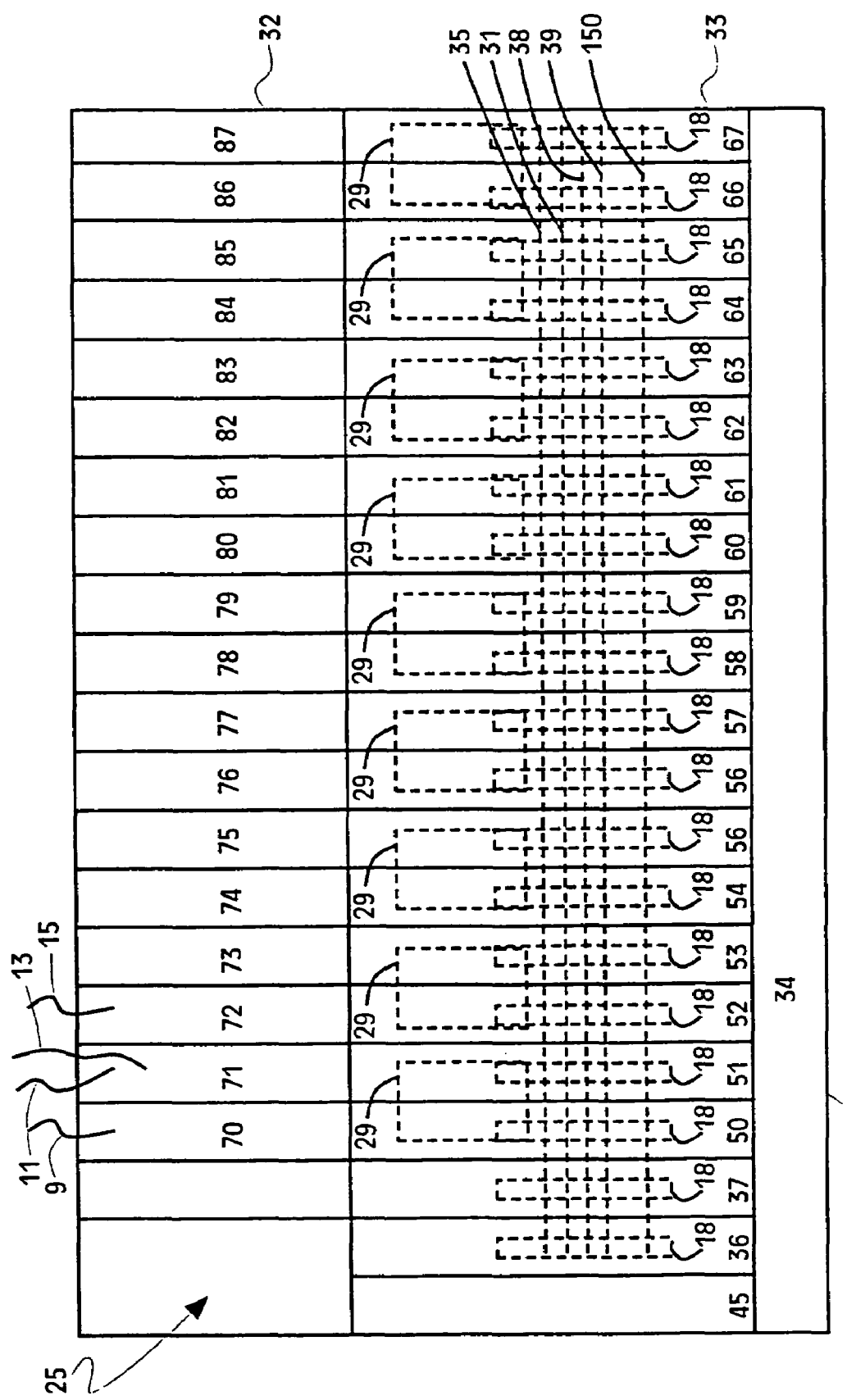
FIG. 3 is a view of a shelf with plug-in circuit cards in the preferred system.

FIG. 3 shows high density shelf 30 supporting access circuitry 25 in central office 5. Shelf 30 is a rear access module with 2 tiers of card slots. Upper tier 32 houses upper tier cards (UTs) 70-87. Lower tier 33 houses line termination cards 50-67 (LTs) for communication with subscribers. Network termination cards 36 and 37 (NTs) interface with circuitry 27 leading to WAN line 28. Alarm-craft interface card 45 collects alarm information from circuitry 25, displays the alarm information locally, and sends the alarm information to other systems. Shelf 30 can accommodate either 1 or 2 NTs, depending on whether redundancy is required, and up to 18 LTs. Each LT includes 12 subscriber lines. Thus, with 18 LTs×12 lines/LT, shelf 30 interfaces to 216 subscriber lines.

Shelf 30 is essentially a mechanical backplane mechanically supporting signal busses 35, 31, 38, and 39; and supporting point-to-point connections 150. Each of busses 35, 31, 38, and 39 includes a plurality of parallel data lines and a plurality of control lines.

Figure 4:
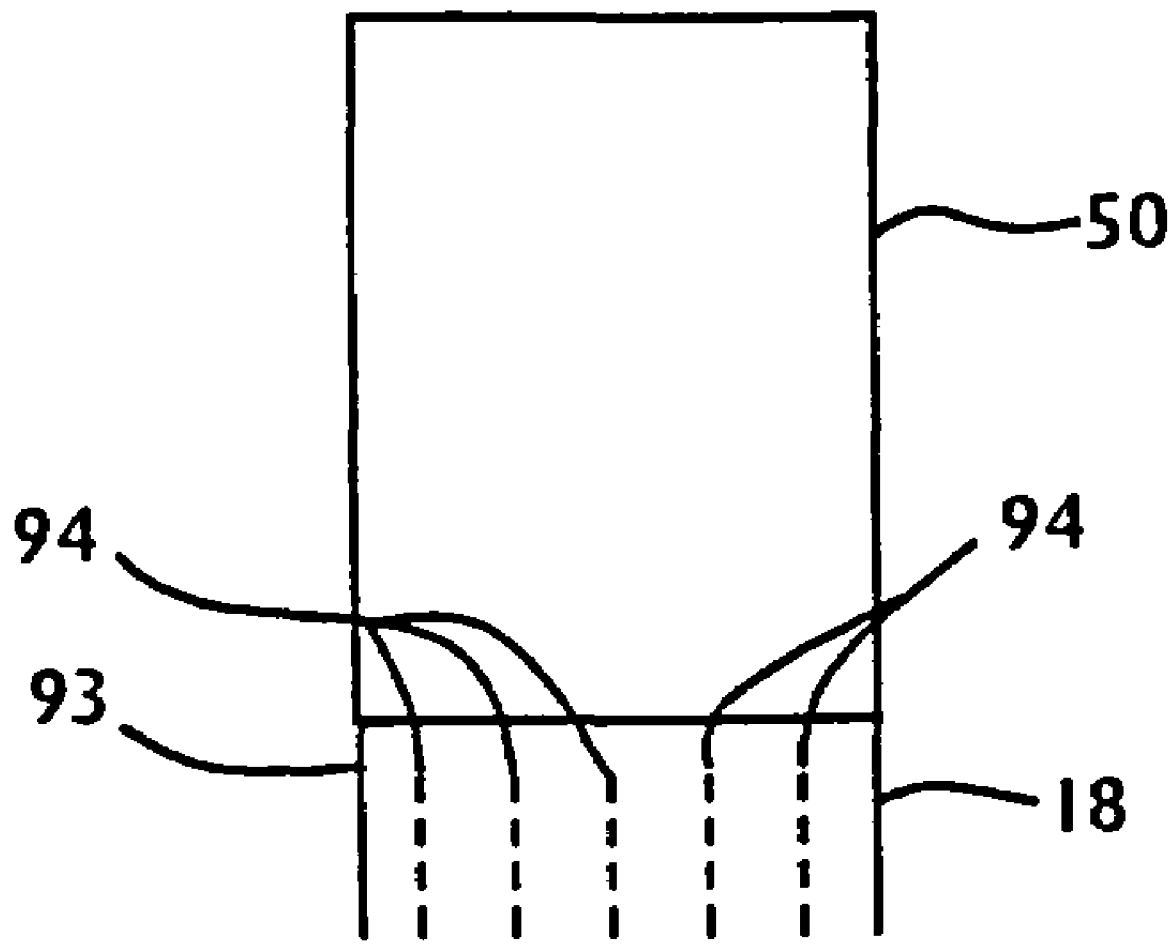
FIG. 4 is a diagram showing a backplane connector for plugging a circuit card into the backplane of a shelf.

Each of cards 36, 37, 45, 50-67, and 70-87 connects to the mechanical backplane via a respective backplane connector 18, such as connector 18 of card 50 shown in FIGS. 3 and 4. Each backplane connector 18 includes a plastic, insulating housing 93 enclosing and supporting a plurality of parallel conductors 94 for sending signals between a card and the backplane. For each of cards 36, 37, and 50-67, the conductors are for sending signals between the card and busses 35, 31, 38, and 39. For example, the conductors inside connector 18 of NT card 37 allow card 37 to sends signals to downstream busses 35 and receive signals from upstream busses 38. The conductors in connector 18 of LT card 51 allow LT card 51 to receive signals from busses 35 and busses 31, and to send signals to busses 38 and busses 39.

Each of cards 36, 37, 45, 50-67, and 70-87 is removably connected to the mechanical backplane.

Point-to-point connections 150 include a pair of current paths in each connection. Point-to-point connections 150 include a connection between NT 36 and each of LTs 50-67. Point-to-point connections 150 also includes a connection between NT 37 and each of LTs 50-67. Point-to-point connections 150 are arranged in parallel in the backplane of shelf 30. Each of point-to-point connections 150 has a higher bandwidth that of any one of busses 35, 31, 38, or 39.

Since certain services inherently interfere with other services, due to incompatibility of spectrum, and since a variety of services may be provided on the same shelf, shelf 30 is structured to keep the services and cabling of those services separate and shielded. Adjacent pairs of LT card slots are cabled to a respective cable connector, represented by reference number 29 in FIG. 2. Each cable connector 29 includes 50 pins, thereby providing for 24 subscriber lines serviceable by the two LTs in the slot pair. For example, the slots for LT 50 and LT 51 share a common cable connector 29. Thus, interfering services are kept on a 2 adjacent slot basis, with cables capable of being shielded through frame ground connections (backplane to connector housing).

For some types of LTs, such as DS1 type (for connections to a remote access multiplexor, for example), the adjacent slot backplane wiring is such that the transmit and receive pairs are routed to separate connectors via the applique cards, allowing one set of pairs (transmit or receive) to be routed to the line connector, while the second set is routed to the conventional telephony network connector, allowing alternate use of these connectors.

Some types of LTs, such as DS3 type, can be provided in a redundant or non-redundant configuration via the use of applique card variants, with coax cable exiting from the applique inset faceplates, then exiting the shelf via cable notches in the shelf top plate. Other than these coax for this special application, all wiring is rear access; only fiber comes off the front of any card. This structure facilitates the EMI requirements and the flammablity requirements imposed by GR1089.

Figure 5:
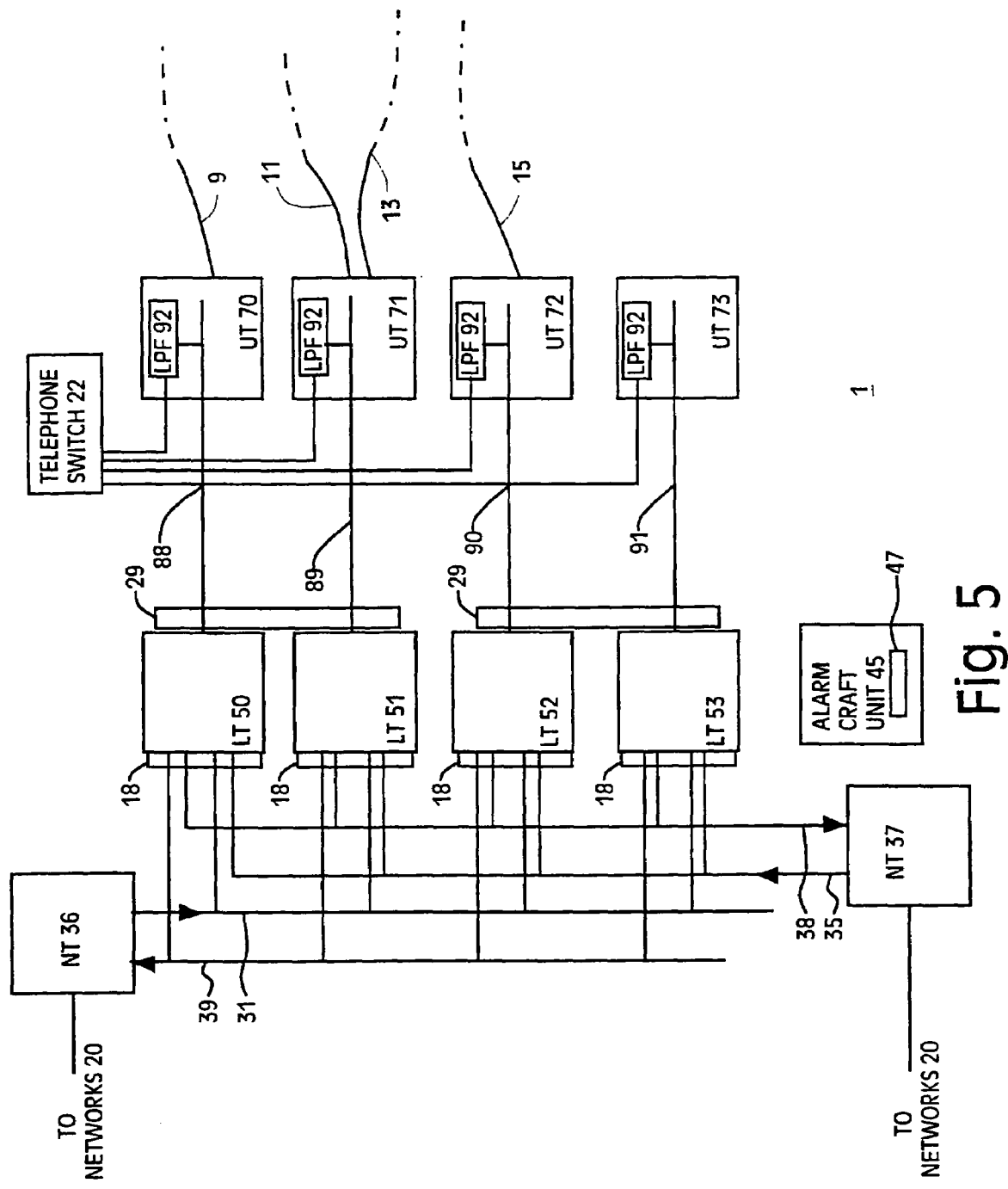
FIG. 5 is a block diagram showing some circuitry in the shelf shown in FIG. 2.

FIG. 5 is a block diagram emphasizing some signal paths in the preferred system. In the example immediately following, NT 37 is a SONET OC3 in an active mode and NT 36 is a SONET OC3 in a standby mode. Referring FIGS. 3 and 5, each LT has an associated upper tier card (UT) in the slot directly above the LT. For example, bus 88 includes 12 pairs of conductors, a pair for each subscriber, between LT 50 and UT 70. Bus 89 includes 12 pairs of conductors between LT 51 and UT 71. Bus 90 includes 12 pairs of conductors between LT 52 and UT 72. Bus 91 includes 12 pairs of conductors between LT 53 and UT 73.

A UT includes any filtering circuitry provided to the subscriber lines. For example, each upper tier card (UT) includes a respective low pass filters (LPF) 92 between the subscriber lines and telephone switch 22.

NT 37 receives Asynchronous Transfer Mode (ATM) cells from interface 27 and sends the cells over downstream busses 35. Each ATM cell includes a pair of identifiers: a Virtual Path Identifier (VPI) and a Virtual Channel Identifier (VCI). Each LT recognizes a set of VPI/VCI pairs (addresses) as identifying a cell destined for one or more subscribers connected to the LT. For example, LT 52 recognizes a set of 1 or more VPI/VCI addresses as identifying a cell destined for a subscriber in building 14. Upon recognizing such a cell, LT 52 generates a DMT signal encoding the cell, and sends the signal to UT 72. UT 72 combines the DMT signal with an analog signal from telephone switch 22, to send a composite signal to the subscriber in building 14, via line 15.

When a subscriber wishes to send data to service provider networks 20, the subscriber modem encodes the data in a DMT signal and sends the DMT signal over, a subscriber line. This DMT signal passes from one of the UTs, to a high pass filter in an LT car, to send a digital signal to NT 37 via one of upstream busses 38.

Thus, NT card 37, downstream busses 35, and upstream busses 38 act to provide the subscribers with access to service provider networks 20. During this time, NT card 36, downstream busses 31, and upstream busses 39 are redundant. In other words, NT card 36, downstream busses 31, and upstream busses 39 are in a standby mode in case NT 37, busses 35, or busses 38 should malfunction. During this time, circuitry 25 acts to test downstream busses 31 and upstream busses 39 for redundant bus integrity, as discussed below in connection with FIG. 4.

Figure 6:
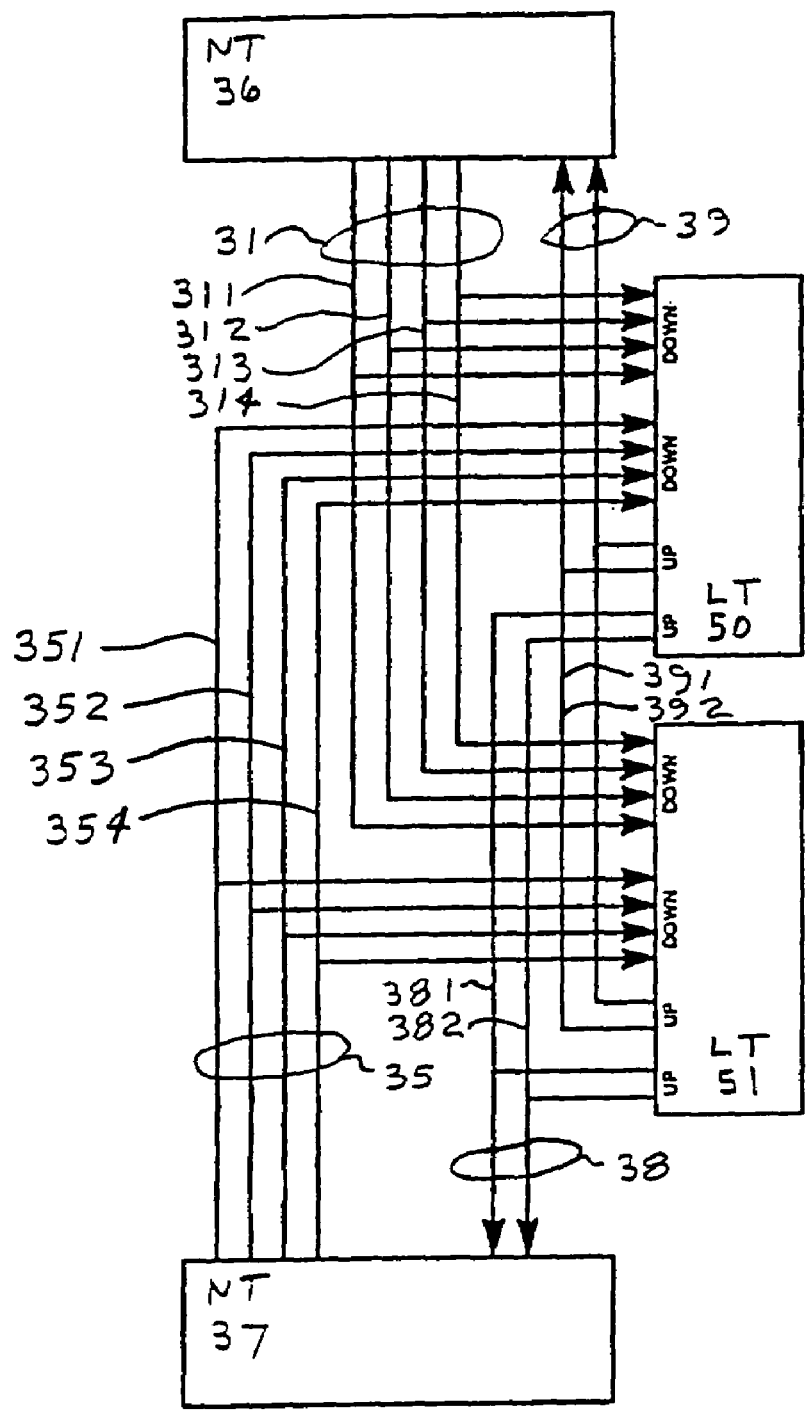
FIG. 6 is a diagram emphasizing some circuitry shown in FIG. 5.

FIG. 6 emphasizes some of the circuitry shown in FIG. 3. Downstream busses 35 include downstream bus 351, downstream bus 352, downstream bus 353, and downstream bus 354. Upstream busses 38 include upstream bus 381, and upstream bus 382. A set of the LTs share upstream bus 381 using a priority-based, cell grant multiplexing scheme, such as described in U.S. patent application Ser. No. 09/084,750 by PHILIPPE GUILLAUME DOBBELAERE and PASCAL LEFEBVRE, filed May 26, 1998 for a method of prioritized data transmission and data transmission arrangement. The contents of U.S. application Ser. No. 09/084,750 are herein incorporated by reference.

A priority-based, cell grant multiplexing scheme, is also described in U.S. patent application Ser. No. 09/022,177 by PHILIPPE GUILLAUME DOBBELAERE and GEERT ARTHUR EDITH VAN WONTERGHEM, filed Feb. 11, 1998 for a priority-based access control method and arrangement. The contents of U.S. application Ser. No. 09/022,177 are herein incorporated by reference.

The priority-based, cell grant multiplexing scheme, cited in the previous paragraph, is also described in European Patent Application No. 97400303.0 by PHILIPPE GUILLAUME DOBBELAERE and GEERT ARTHUR EDITH VAN WONTERGHEM, filed Feb. 11, 1997 for a Priority-based access control method and arrangement. The contents of European Patent Application No. 97400303.0 are herein incorporated by reference.

Another set of the LTs share upstream bus 382 using the priority-based, cell grant multiplexing scheme.

This configuration of multiple busses allows a bandwidth of 622 Mbps downstream and 300 Mbps upstream. Downstream busses 31 include downstream bus 311, downstream bus 312, downstream bus 313, and downstream bus 314. Upstream busses 39 include upstream bus 391, and upstream bus 392. When no malfunction exists in circuitry 25, downstream busses 31, upstream busses 39, and NT 36 are redundant.

The architecture of system 1 allows services to be managed and refined, and allows failure recovery without manual intervention. Upon activating an LT, such as LT 51, NT 37 assigns LT51 to one of busses 351, 352, 353, or 354, and assigns LT 51 to one of busses 381 or 382. For example, NT 37 may initially assign LT 51 to bus 351 to bus 381. Subsequently, depending on bandwidth needs and congestion, NT 37 may reassign LT 51 to a more appropriate bus set.

NT 37 also instructs LT 51 to recognize the set of VPI/VCI addresses for the subscribers connected to UT 71, including the subscribers on lines 11 and 13. More specifically, NT 37 sends the set of VPI/VCI addresses, to be recognized by LT 51, via an operations channel on downstream bus 351. This operations channel is a stream of ATM cells having a VPI/VCI address assigned to LT 51 itself. When LT 51 sees an ATM cell with the VPI/VCI of LT 51 itself, LT 51 interprets the remainder of the cell as a command from NT 37. One such command is to recognize a new VPI/VCI as belonging to the subscriber (s) to be associated with LT 51. Thus, NT 37 routes the proper subscriber ADSL traffic to LT 51.

Non-volatile memory 47 in alarm-craft unit 45 stores a cross connect database, which is effectively a respective list of VPI/VCI pairs for each subscriber line associated with each LT. Non-volatile memory 47 also stores a table of data rates for each subscriber.

Each of downstream busses 351, 352, 353, and 354 includes 8 parallel data bit signal lines, and signal lines for cell synchronization, idle cell indication, upstream access start, and grant. Each of upstream busses 381 and 382 includes 8 parallel data bit signal lines, and signal lines to indicate upstream cell synchronization; upstream access arbitration, on which the LTs write respective priority codes via open drain buffers (pull line low); upstream access allowed, which identifies the shelf that won the access in the multiplexing scheme described in application Ser. No. 09/022,177 cited above; the winning priority code in the multiplexing scheme; and upstream output enable, asserted low by an LT (open drain) when it sends a cell.

NT 37 generates common clock synchronization signals for the LTs. NT 37 generates a maximum of 1 clock synchronization signal for every 2 LTs.

A signal called "extender change status" is common to busses 35 and 38, and indicates if busses 35 and 38 are in active mode or standby mode. A signal called "error indication" is common to busses 35 and 38, and is asserted low by an LT (open drain) if and when the LT detects an error on busses 35 or 38.

Each of downstream busses 311, 312, 313, and 314 includes 8 parallel data bit signal lines, and signal lines for cell synchronization, idle cell indication, upstream access start, and grant. Each of upstream busses 391 and 392 includes 8 parallel data bit signal lines, and signal lines to indicate upstream cell synchronization; upstream access arbitration, on which the LTs write respective priority codes via open drain buffers (pull line low); upstream access allowed, which identifies the shelf that won the access in the multiplexing scheme described in application Ser. No. 09/022,177 cited above; the winning priority code in the multiplexing scheme; and upstream output enable, asserted low by an LT (open drain) when it sends a cell.

NT 36 generates common clock synchronization signals for the LTs. NT 36 generates a maximum of 1 clock synchronization signal for every 2 LTs.

A respective "extender change status" signal is common to busses 31 and 39, and indicates if busses 31 and 39 are in active mode or standby mode. A respective "error indication" signal is common to busses 31 and 39, and is asserted low by an LT (open drain) if and when the LT detects an error on busses 31 or 39.

Figure 7:
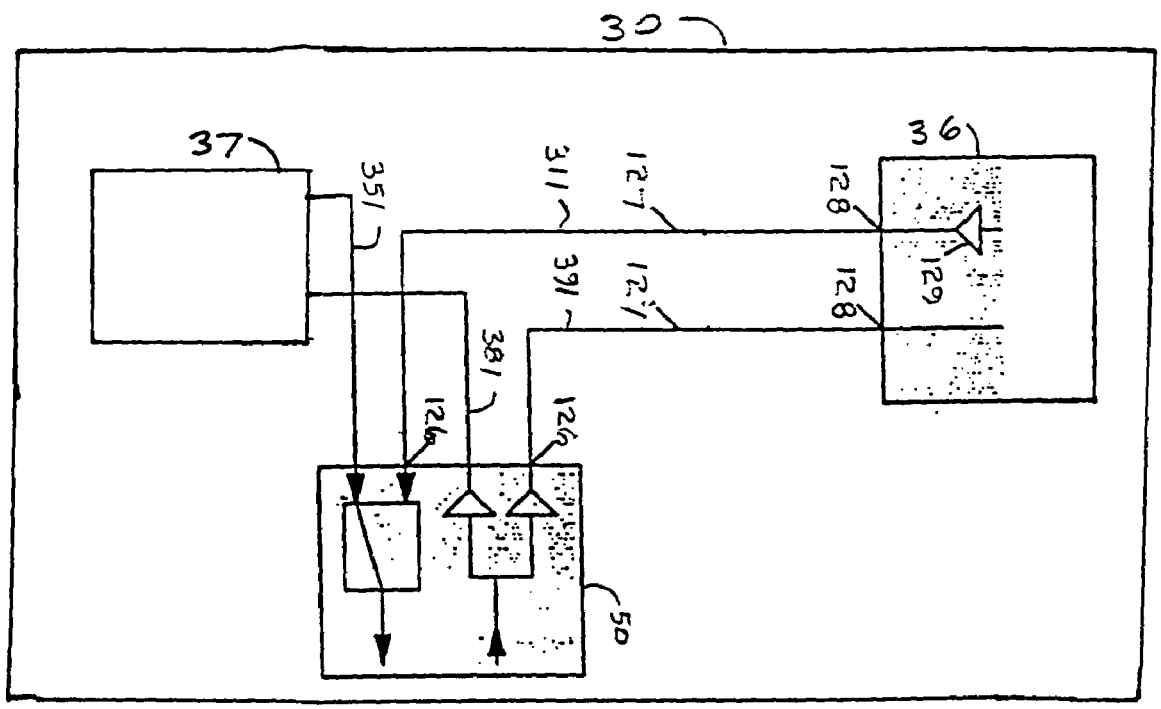
FIG. 7 is a diagram emphasizing other circuitry shown in FIG. 5.

FIG. 7 is a diagram emphasizing signal paths used to test backup downstream busses 31 and backup upstream busses 39. The purpose of this testing is to prevent silent failures of busses 31 and 39, while busses 35 and 38 are being employed for subscriber signal traffic. This error detection process relies on transmit activity of each active LT, in turn. In the example shown in FIG. 5, downstream busses 351 and upstream busses 381 act with NT 37 to provide network access to LT 50. Concurrently, transmit activity of LT 50 tests the signal paths in upstream busses 391, NT 36, and downstream busses 311, which are in a standby mode. When LT 50 is enabled to transmit a cell on upstream bus 381, test circuitry in LT 50 receives data from downstream bus 311, to transmit data on upstream bus 391. This error detection process may detect LT back plane connector faults, such as open pins, at locations represented at reference number 126 in FIG. 7. This process also may detect back plane faults, such as shorts and opens, at locations represented at number 127. This process also may detect back plane connector faults, such as open pins, at the standby NT 36 at locations represented by the reference number 128. This process may also detect faults on the NT 36 between the IC-resident buss controller and the backplane connector, such faults including IC pin faults, printed board assembly track faults, and driver faults, as represented by reference number 129.

Figure 8:
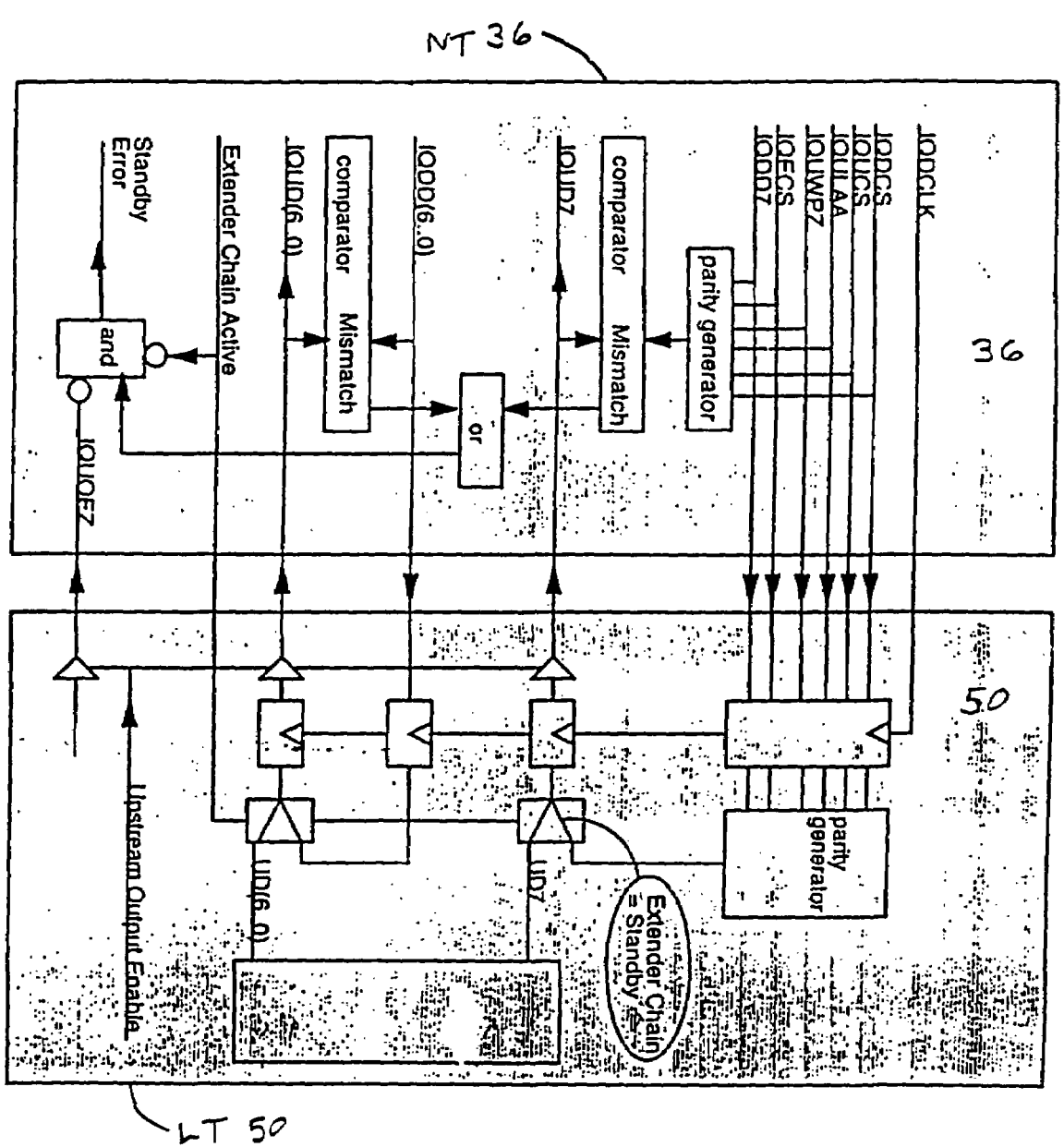
FIG. 8 is a diagram emphasizing other circuitry shown in FIG. 5.

FIG. 8 shows the circuitry of FIG. 7 with more emphasis on the signal paths between LT 50 and NT 36. Downstream busses 311 includes data signals IQDD0, IQDD1, IQDD2, IQDD3, IQDD4, IQDD5, IQDD6, IQDD7. Downstream busses 311 also includes control signals called IQDCLK, IQDCS, IQUCS, IQULAA, IQUWP7, IQECS, and "extender chain active."

Upstream busses 391 includes data signals IQUD0, IQUD1, IQUD2, IQUD3, IQUD4, IQUD5, IQUD6, IQUD7.

As represented in FIG. 8, an LT, such as LT 50, generates bus test signals when upstream output enable (IQUOEZ) is true and the extender chain active signal is false. In other words, because of this dependence on upstream output enable, in essence each LT generates test signal in synchronism with the upstream, priority-based, cell grant multiplexing scheme, cited above.

Generating test signals in an LT includes generating IQUD0 through IQUD6 by looping back the signals IQDD0 through IQDD6, respectively. Generating test signals in an LT also includes generating an odd parity signal on the combination of IQDCS, IQUCS, IQULAA, IQUWPZ, IQECS, and IQDD7. The LT then sends the parity signal on IQUD7.

As represented in FIG. 8, the standby NT generates bus test signals when upstream output enable (IUOEZ) is true and the extender chain active signal is false. Generating test signals in the standby NT includes comparing IQDD0 to IQDD6 with IQUD0 through IQUD6, respectively, and setting "standby bus error" to be true if there is a mismatch. Generating test signals in an NT also includes generating an odd parity signal on the combination of IQDCS, IQUCS, IQULAA, IQUWPZ, IQECS, and IQDD7, comparing this odd parity signal with IQUD7, and setting "standby bus error" to be true if there is a mismatch. Generating test signals in an NT also includes sending a standby bus test pattern on IQDCS, IQUCS, IQULAA, IQUWPZ, IQECS, and IQDD7, as discussed below in connection with FIG. 7.

Figure 9A:
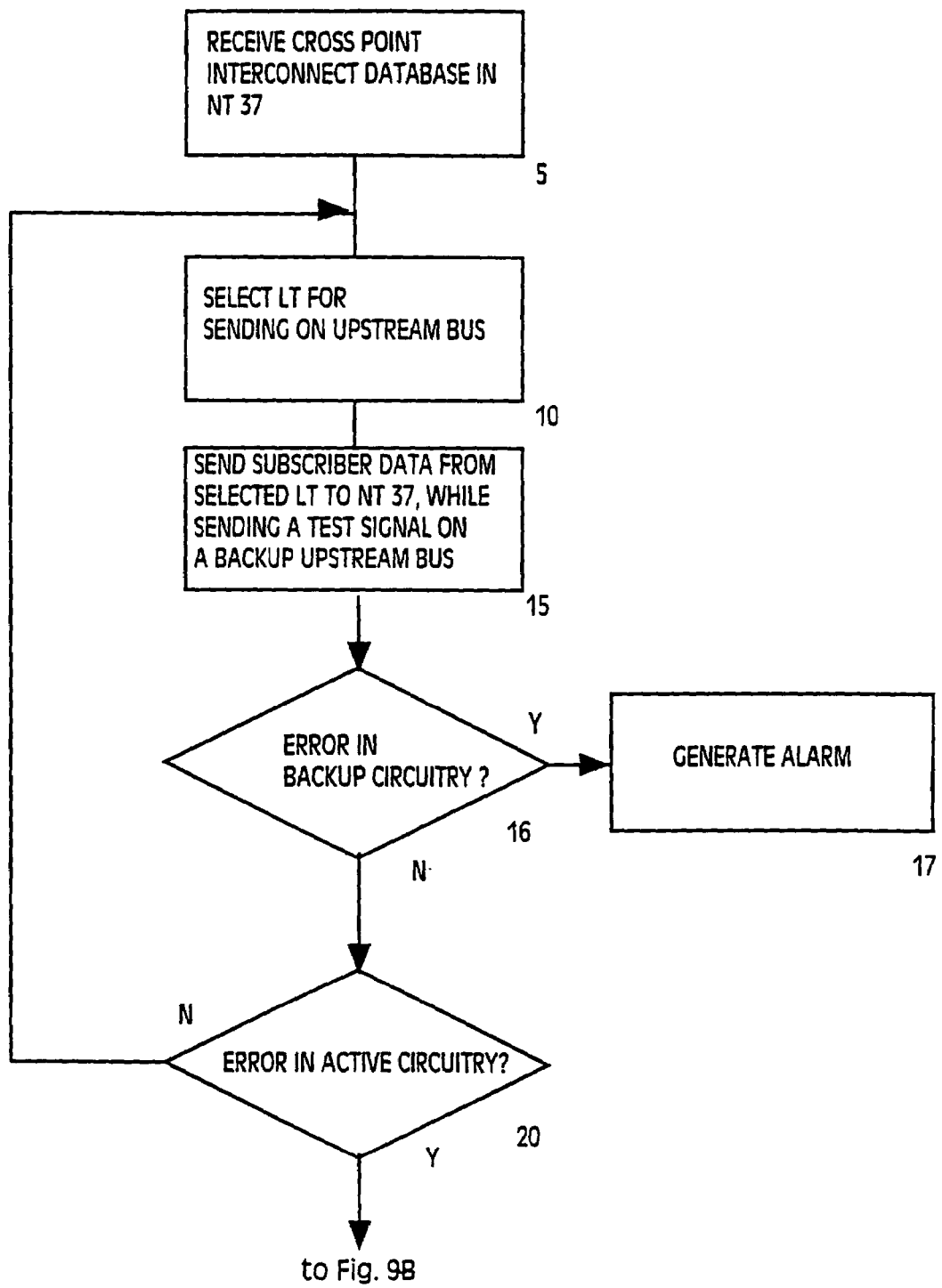

FIGS. 9A and 9B show a process performed by system 1. NT 37 receives the cross point inter-connect, allowing NT 37 to route ATM cells from Network 20 to the appropriate one of downstream busses 351, 352, 353, or 354. (step 5). System 1 selects one of the LT cards assigned to upstream bus 381, to determine which of these bus-381-assigned LT cards is eligible to send the next cell on bus 381. System 1 selects this LT card using the priority-based, cell grant multiplexing scheme cited above. (step 10). The selected LT card sends an upstream ATM cell on bus 381, while the selected LT card sends a signal on a back-up upstream bus, such as upstream bus 391, to test a signal path between the selected card, bus 391, and one of backup downstream busses 31, such as bus 311 (step 15). If step 15 detects an error in the back-up circuitry (step 16), alarm craft unit 45 generates an alarm signal (step 17), to allow personnel to service the back-up circuitry.

While NT 37, busses 35 and busses 38 continue to operate without fault (step 20), system 1 performs steps 10 and 15 for upstream transmission, and also and sends ATM cells from NT 37 onto downstream busses 35.

If system 1 detects a fault in NT 37, busses 35, or busses 38 (step 20), alarm craft unit 45 sends the VPI/VCI pairs of the cross point inter-connect database from non volatile memory 47 to NT 36, to allow NT 36 to assume the function of routing ATM cells from Networks 20 to one of downstream busses 311, 312, 313, or 314 (step 25).

Figures 10, 11:
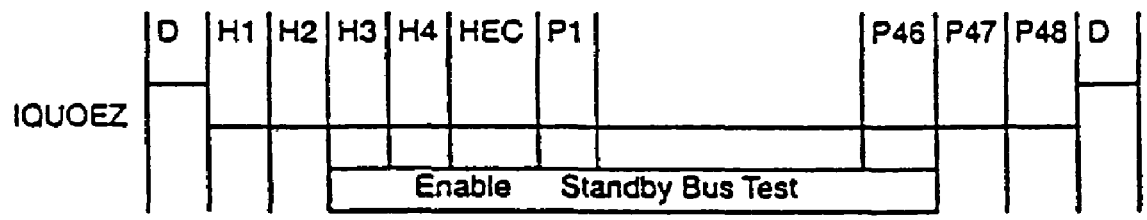
FIG. 10 is a diagram describing a test signal generated in the preferred system.
FIG. 11 is a timing diagram for enabling the signal described in FIG. 10.

FIG. 10 shows the standby bus test pattern. The standby NT sets a bus test pattern on IQDCS, IQUCS, IQULAA, IQUWPZ, and IQDD7 as shown in FIG. 10, wherein N, N+1, etc indicate consecutive cells.

FIG. 11 is a timing diagram for the enablement of the standby bus test. To avoid problems with different clock domains, the standby bus test is only enabled during ATM cell header bytes 3 and 4 (H3 and H4 in FIG. 7), the header error correction byte (HEC in FIG. 8), and payload byte 1 through 46 (P1 through P46 in FIG. 11).

Thus, standby busses are constantly monitored via a test pattern to help ensure that the standby busses are operational; to reduce the chance of a silent failure.

In summary, each LT includes circuitry to receive a common ATM cell stream signal from an active NT via a downstream bus to which the LT is assigned. The cell stream is common in the sense that other LTs may be assigned to the same downstream bus. LT assigned to a particular down stream bus examine a common ATM cell stream from the active NT. Each LT encodes selected parts of the common cell stream signal to generate a respective DMT signal for sending to a subscriber. In other words, a particular LT will only send a DMT signal for cells having a VPI/VCI address corresponding to a subscriber on one of the subscriber lines connected to the LT.

Either NT 37 or NT 36 is a potential source of a downstream cell stream signal. For example, a set of LTs may receive a common cell stream signal from NT 37. Concurrently, the system 1 may test the standby busses between each upstream enabled LT and NT 36. Subsequently, if a problem is detected with downstream busses 35, NT 37, or upstream busses 38, NT 36 is enabled so that the set of LTs will receive the common cell stream signal from NT 36 and one of downstream busses 31.

More specifically, while the set of LTs are receiving the common cell stream signal from NT 37 via one of busses 35, NT 36 sends a downstream test signal on busses 31. The downstream test signal includes IQDCS, EQECS, IQDD7, IQUD0-IQDD6. When an LT becomes upstream enabled, the LT generates an upstream test signal, in response to the downstream test signal. The upstream test signal includes a plurality of digit positions (IQUD0-IQUD6), each corresponding to a respective IQUD0-IQDD6. Generating the upstream test signal includes generating parity, which is a type of a redundancy signal. Comparators in NT 36 act to examine the upstream test signal received from the LT.

FIG. 12 emphasizes another aspect of system 1. System 1 includes a plurality of respective point-to-point connections 150 between each LT and each NT as shown in FIG. 12. Point-to-point connections allow high speed data to be sent/received, in various formats. Point-to-point connections 150 may be configured for various services via other ports, such services including IP, frame relay, or frame relay to ATM.

Each point-to-point connection 150 is a pair of current paths. Each point-to-point 150 connection is insulated from the other point-to-point connections 150.

Second Embodiment

Figure 13:
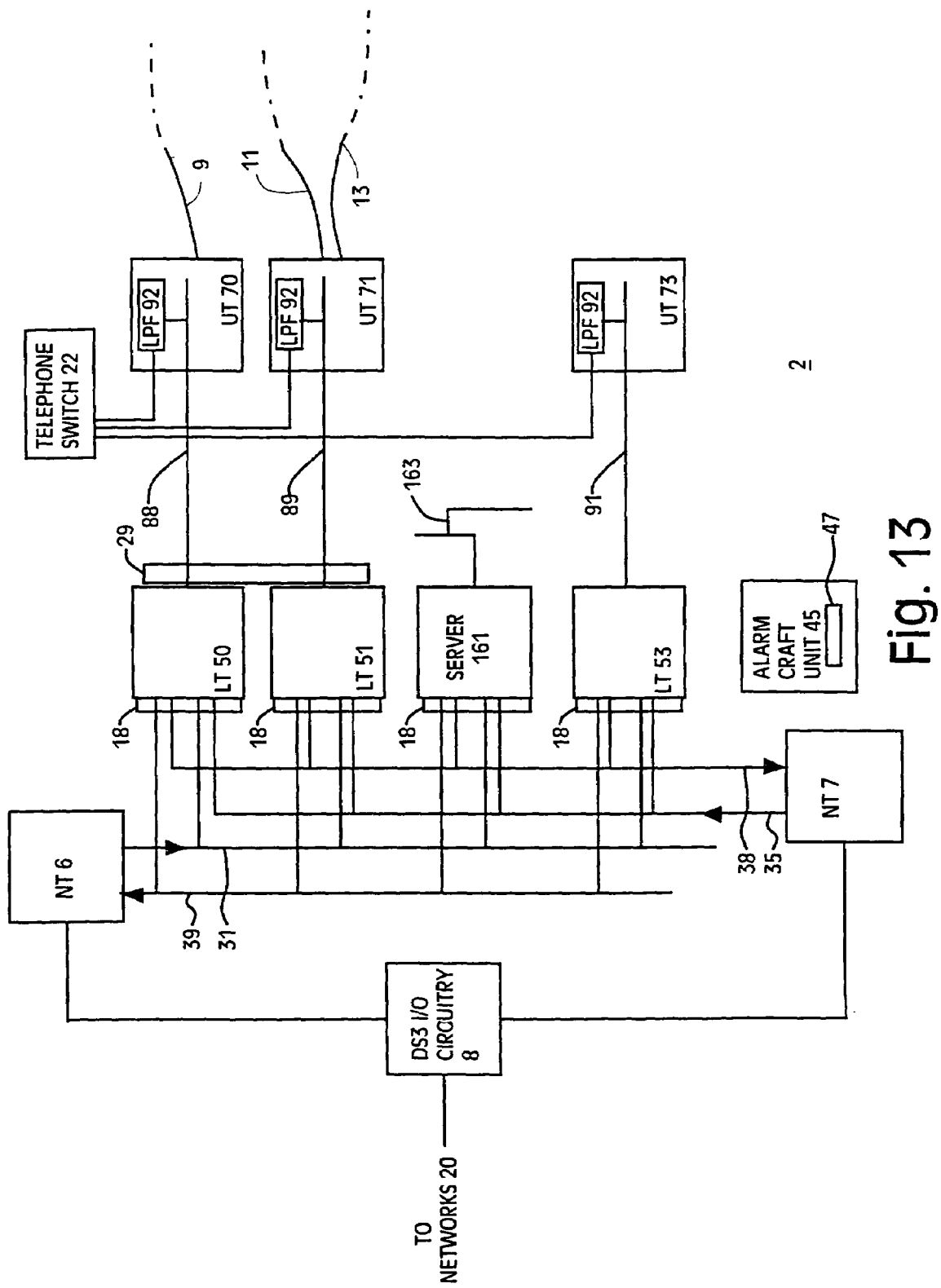
FIG. 13 is block diagram showing some circuitry in a communication system in accordance with a second preferred embodiment of the present invention.

FIG. 13 shows system 2 in accordance of a second preferred embodiment of the present invention. NT 6 and NT 7 are the same as NT 36 and NT 37 of the first preferred embodiment except that NT 6 and NT 7 each contain a DS3 port, instead of an OC 3 port, and are each connected to common DS3 I/O circuitry 8. System 2 also includes a server 161 residing in shelf 30, the first shelf of the daisy-chained series of shelves 30 and 30'. An ATM switch function in the NT 7, allows data to be routed to the normal ATM network of the LT cards, or routed to server 161, which acts as a server or gateway function. In the example shown, server 161 acts as a translator between ethernet 163 and the ATM network upstream. Other types of applications may employ this function—including an interworking unit that takes ATM cells containing voice, and converts them into a TDM interface to a class 5 telephony switch.

Respective downstream busses may be used for respective services, having respective protocols and data rates.

The NT may be DS1 (or E1), HDSL2, DS3 (or E3), OC3 or OC12 based. Upgrades to higher bandwidth NTs may be effected without interrupting subscriber service. Upgrades to higher bandwidth NTs includes removing the inactive NT (in a redundant configuration), replacing with a higher bandwidth NT, switching over service to the new NT, then replacing the original NT with the higher bandwidth redundant unit.

To provide for extended bandwidth when upgrading to 622 Mbps service, an extra set of daisy chains cables 42 and 46 may be installed between the NT and NT' extender cards.

Alarm craft unit 45 communicates with whichever NT is designated active. An ethernet port may be provided between unit 45 and an external OS. The ethernet port may be accessible from the front panel of unit 45, or via a rear access connector on the backplane for more permanent connections. Similarly, craft interfaces are provided by unit 45 on either front panel, or rear access.

The remainder of the extra I/O between the NTs and ACU consist of high speed communication interfaces (fire wire) to allow a source of common database memory for the redundant NTs, implemented on the ACU with reprogrammable, high-density, flash memory. This allows quick recovery of service during NT failures in redundant configurations.

LTs may be for ADSL, HDSL2, IDSL, DS1, E1, DS3, E3, OC3, or other xDSL service. While ADSL, HDSL2, and IDSL are primarily used for subscriber interfaces, HDSL2 may be used in hubbing arrangements to communicate with remote access multiplexors, as is the DS1, E1. Multiplexors are disclosed in U.S. patent application Ser. No. 08/891,145 by RICHARD M. CZERWIEC, JOSEPH E. SUTHERLAND, PETER M. L. SCHEPERS, GEERT A. E. VAN WONTERGHEM, MARLIN V. SIMMERING, EDUARD C. M. BOEYKENS, CHRIS VAN DER AUWERA, PETER A. R. VAN ROMPU, KURT PYNAERT, DANIEL A. C. VERLY, GILBERT A. F. VAN CAMPENHOUT, RICHARD H. BAILEY, ROBERT N. L. PESCHI, DIRK M. J. VAN AKEN, EMMANUEL F. BOROWSKI, PETER P. F. REUSENS, HERMAN L. R. VERBUEKEN, FRANK RYCKEBUSCH, KOEN A. G. DE WULF filed Jul. 10, 1997 for TELECOMMUNICATIONS SYSTEM FOR PROVIDING BOTH NARROWBAND AND BROADBAND SERVICES TO SUBSCRIBERS; SUBSCRIBER EQUIPMENT; A SHELF THEREFOR; A REPLACEABLE LOWPASS FILTER UNIT; LINE TERMINATION EQUIPMENT; NETWORK TERMINATION EQUIPMENT; AND A TELECOMMUNICATIONS RACK WITH A PLURALITY, the contents of which is herein incorporated by reference.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A method for a system including a plurality of encoders each for receiving a first signal and encoding to generate a respective second signal for sending to a respective subscriber, the method comprising:

receiving, in each encoder, the first signal from a first source, while testing a signal path between a second source and the encoders, the first source on a first assembly, the second source on a second assembly, and each encoder on a respective third assembly;

while each encoder is receiving the first signal from the first source:
  receiving, in each encoder, a third signal from the second source;
  generating, from each encoder, a fourth signal based on the third signal, the fourth signal being a redundancy signal; and
  receiving and examining the fourth signal at the second source; and
subsequently receiving the first signal from the second source.

* * * * *

UNITED STATES PATENT AND TRADEMARK OFFICE
CERTIFICATE OF CORRECTION

PATENT NO. : 7,609,622 B2  Page 1 of 1
APPLICATION NO. : 10/701089
DATED : October 27, 2009
INVENTOR(S) : Czerwiec et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1292 days.

Signed and Sealed this

Twelfth Day of October, 2010

David J. Kappos
*Director of the United States Patent and Trademark Office*